Figure 2A:
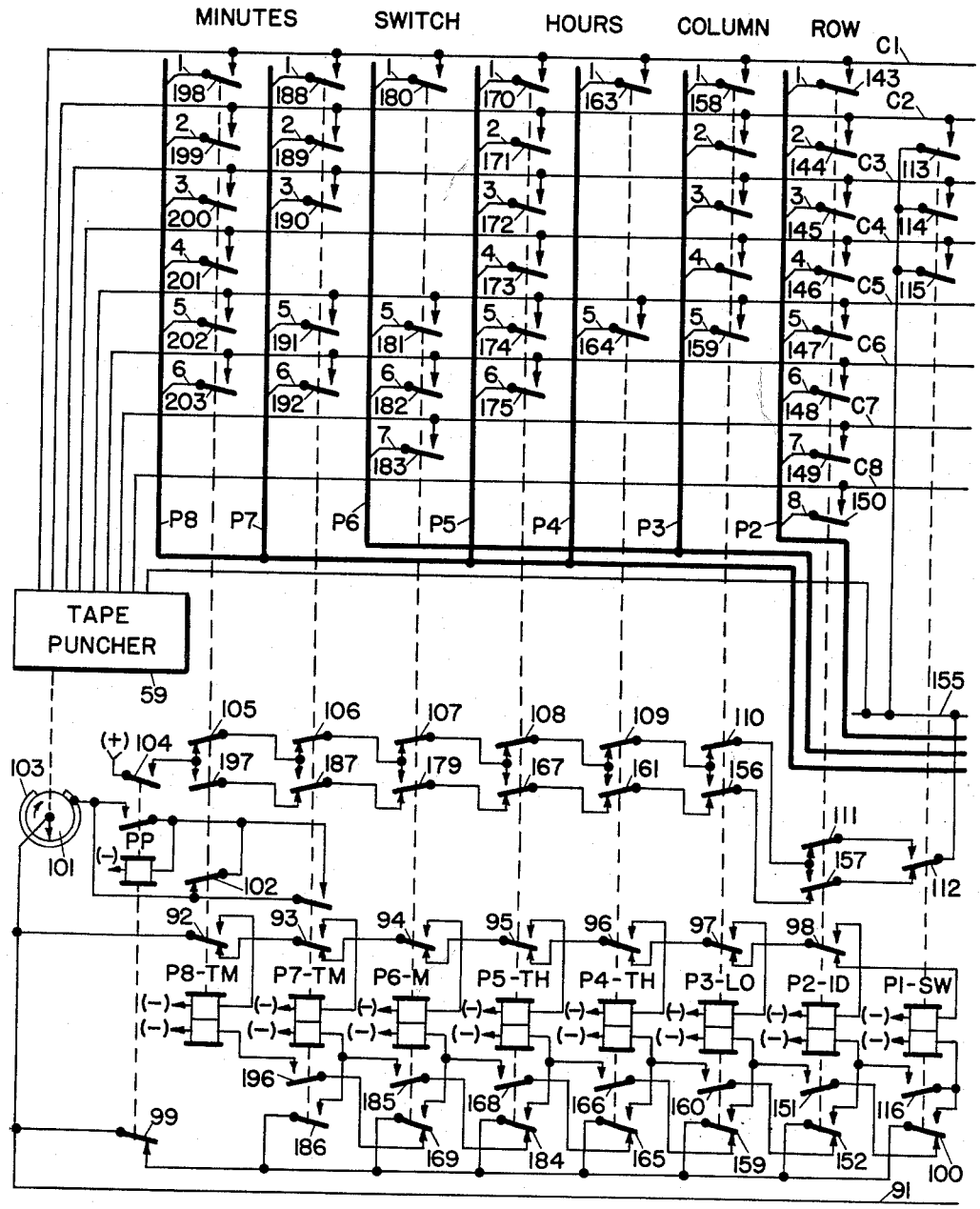

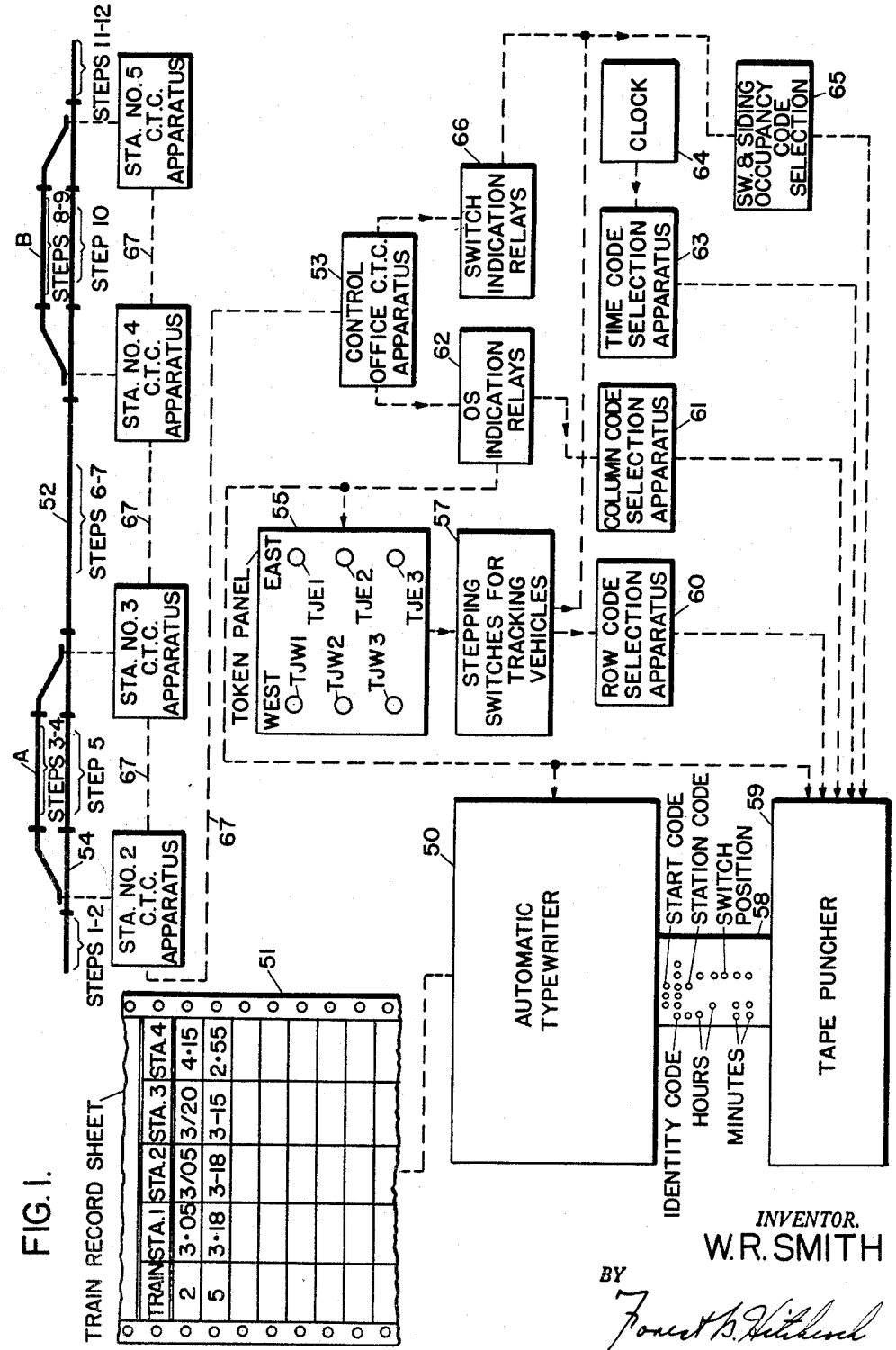

March 30, 1965 W. R. SMITH 3,176,125
RECORDING SYSTEM FOR VEHICLE TRAFFIC
Filed May 29, 1961 7 Sheets-Sheet 2

INVENTOR.
W. R. SMITH
BY
HIS ATTORNEY

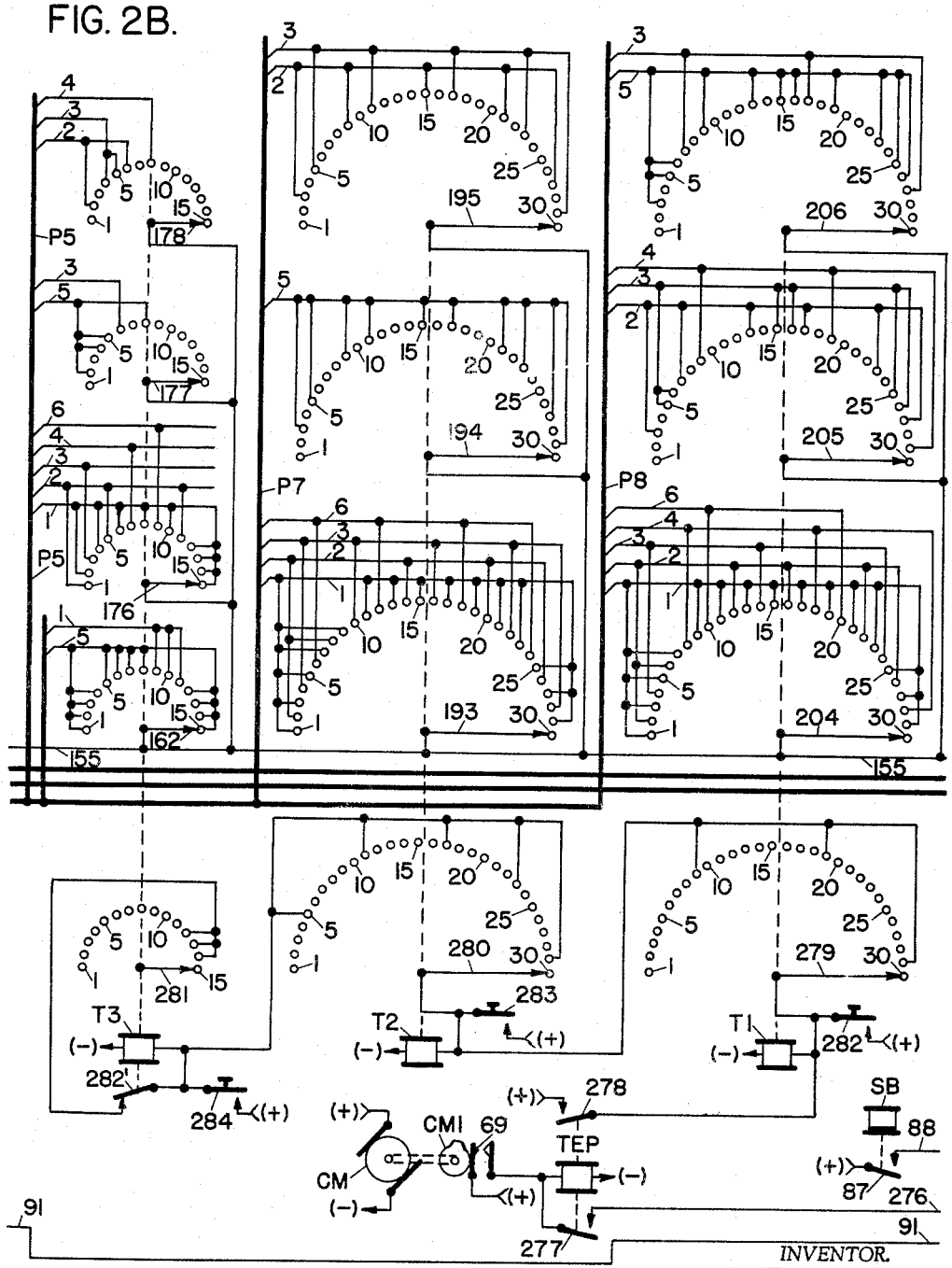

March 30, 1965 W. R. SMITH 3,176,125
RECORDING SYSTEM FOR VEHICLE TRAFFIC
Filed May 29, 1961 7 Sheets-Sheet 4

INVENTOR.
W. R. SMITH
BY
HIS ATTORNEY

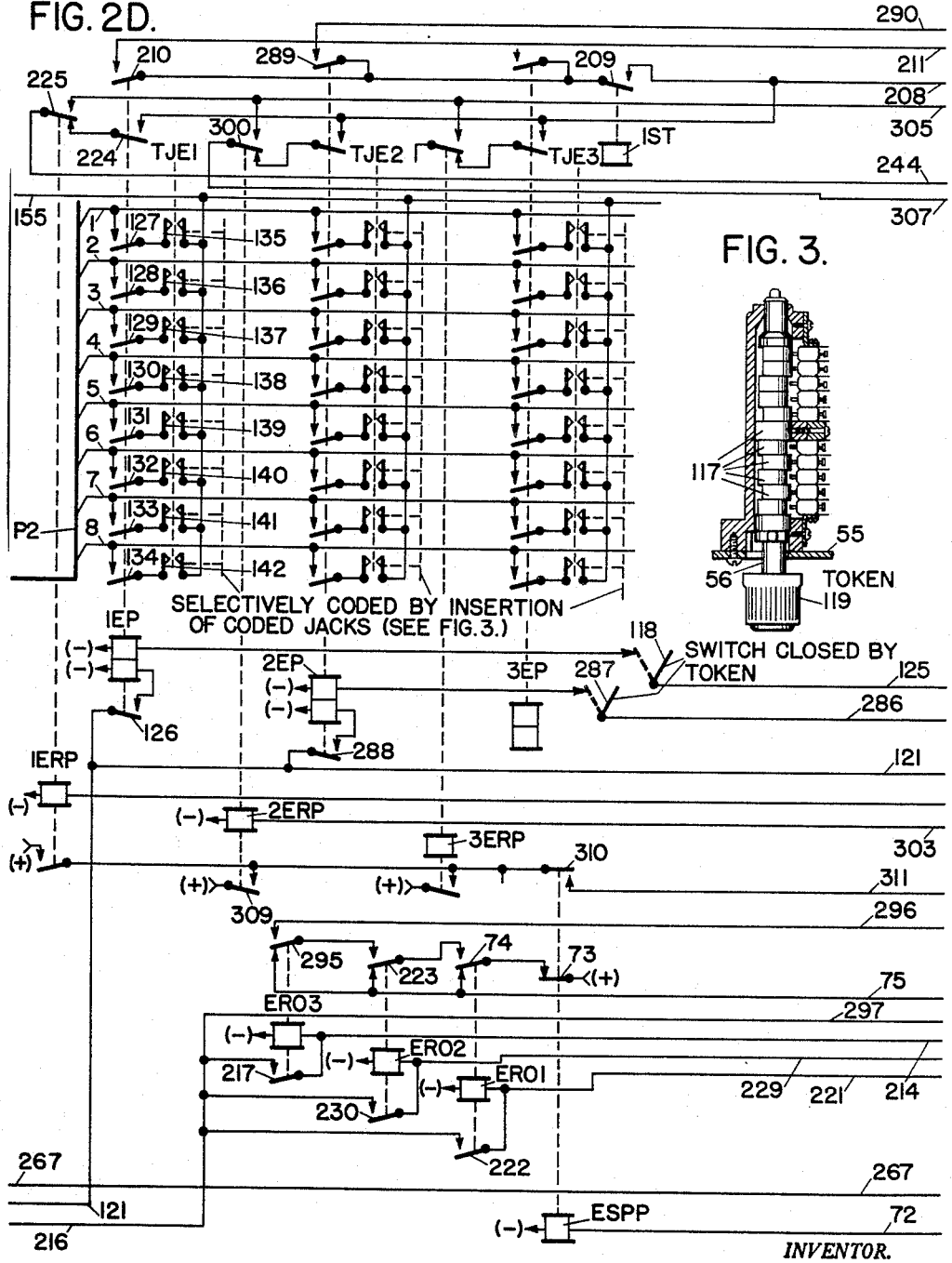

March 30, 1965 W. R. SMITH 3,176,125
RECORDING SYSTEM FOR VEHICLE TRAFFIC
Filed May 29, 1961 7 Sheets-Sheet 6

INVENTOR.
W. R. SMITH
BY
Forest H. Hitchcock
HIS ATTORNEY

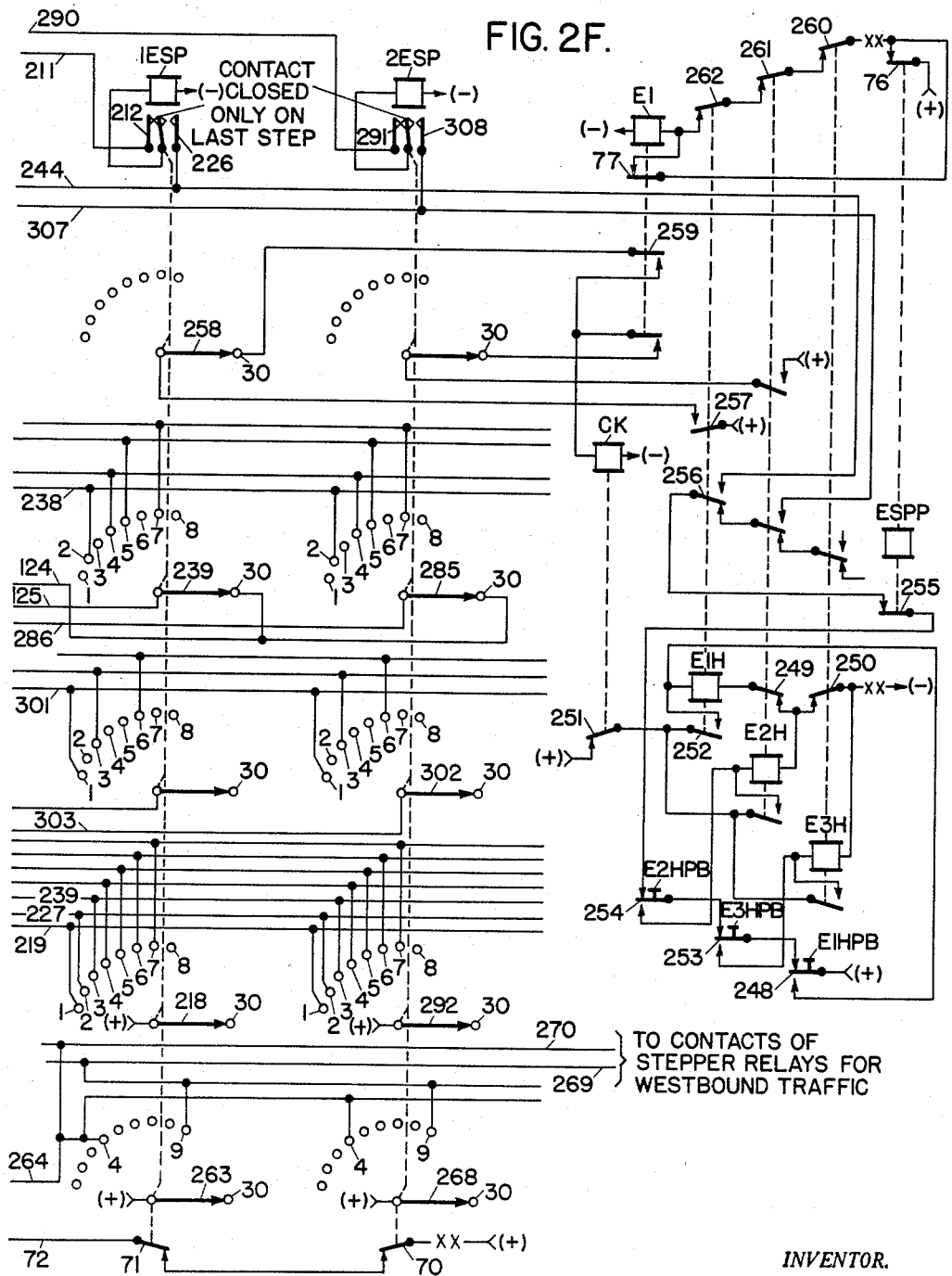

United States Patent Office 3,176,125
Patented Mar. 30, 1965

3,176,125
RECORDING SYSTEM FOR VEHICLE TRAFFIC
Willis R. Smith, Rochester, N.Y., assignor to
General Signal Corporation
Filed May 29, 1961, Ser. No. 113,302
20 Claims. (Cl. 246—123)

This invention relates to recording systems for vehicle traffic and it more particularly pertains to a recording system for automatically printing arrival times of vehicles when passing given spaced locations along a right-of-way in designated rows and columns in a tabulation on a record sheet.

The usual practice in centralized traffic control systems for railroads for recording the passage of trains is to record the progress of the trains on a recording sheet which is driven in accordance with time. There are several laterally spaced recording pens which provide markings on the recording sheet when their associated spaced locations along the right-of-way are occupied by trains. To complete the record of the progress of a train, it is necessary to draw interconnecting lines between recordings at the several locations.

The system according to the present invention provides a printed record of the arrival times of vehicles at the spaced locations in a manner to provide in a fully automatic manner a more comprehensive record of the progress of vehicles. The arrival times of a particular vehicle at various locations throughout a right-of-way are typed as the vehicle progresses in a given row on a record tabulation form, with the times of arrival at the several spaced locations for the vehicle being in different columns in an order comparable to the passage of the vehicle through the locations successively.

This mode of operation is accomplished by the operation of an automatic typewriter in accordance with a punched tape input to the typewriter. The tape is punched each time a vehicle enters a location along the right-of-way to carry successively codes indicative of vehicle identities, location in the right-of-way, time (hours) switch position and occupancy conditions and time (minutes). When this tape is fed into the automatic typewriter, the record sheet is positioned in a particular row by the vehicle identity code and is actuated to a position for typing in a particular column in accordance with the location code. The time and switch position and occupancy codes are then used to govern the information to be typed into the space that has been selected on the record sheet.

The operation of the system is fully automatic, except for the designation of the identities of the vehicles upon entering the territory. Such designation can be accomplished by the insertion of a code designating token in a jack in a suitable control panel, the token being effective to register a code indicative of the row on the recording sheet where the associated vehicle will have its progress reported, and the particular jack into which the token is inserted on the control panel being effective to select a particular storage device, such as a stepping switch, to be used for tracking the progress of the associated vehicle throughout the territory for which the recording system is provided.

An object of the present invention is to provide a recording system for registering the times of passage of vehicles through predetermined locations in a tabulation on a record sheet by automatically typing the times in appropriate tabulations on the record sheet in response to the progress of the vehicle.

Another object of the present invention is to automatically register the times of arrival of a vehicle at different locations throughout the right-of-way all in the same row on a record sheet.

Another object of the present invention is to indicate the route of each vehicle through each location by typing a symbol indicative of the position of the switch at each location along with the arrival time of the vehicle at that location.

Other objects, purposes and characteristic features of the present invention will be in part obvious from the accompanying drawings and in part pointed out as the description of the invention progresses.

In describing the invention in detail, reference is made to the accompanying drawings for a disclosure of one embodiment of the present invention in which like letter reference characters are used throughout the several illustrations to designate parts of a similar nature or function, and in which:

FIG. 1 is a block diagram of one embodiment of a recording system provided in accordance with the present invention;

FIGS. 2A through 2F when placed side by side illustrate a typical circuit organization for operation of an automatic typewriter to register on a record sheet records as to the progress of vehicles; and FIG. 3 is an elevational view, shown partially in cross section, of a typical token which can be employed in the recording system for code designation of the identity of a vehicle to have its passage recorded on a record sheet in the automatic typewriter.

The general organization of the system involves apparatus illustrated in FIG. 1 in block form for the control of a suitable Automatic Typewriter 50 to provide a typewritten record on a suitable train record sheet such as the section of the Train Record Sheet 51. This Train Record Sheet is ruled in rows and columns, the first column being for vehicle identity, and the subsequent columns being for the different successive locations or field stations along a right-of-way for which the recording system is provided. It is provided that the times of passage of a vehicle past successive locations are typed in successive columns of the Train Record Sheet, all in one row. Thus the times recorded on the sheet in the first row, for example, are the times of passage past successive locations along the route of train No. 2 for eastbound traffic. Similarly the times recorded in the second row of the Train Record Sheet are for the times of passage past successive locations of a westbound train No. 5.

The system is illustrated in FIG. 1 as being provided for recording the passage of vehicles along a right-of-way comprising a stretch of single track 52 having passing sidings A and B associated therewith. It is assumed that a conventional centralized traffic control system is provided for the control of signals (not shown) and for the power operation of the track switches at the ends of the passing sidings. Field stations Nos. 2 and 3 are provided for the centralized traffic control of the track switches at the respective ends of passing siding A and field stations Nos. 4 and 5 are provided for the control of apparatus at the track switches at the respective ends of passing siding B. These field stations are connected by a suitable communication channel 67 which extends to suitable Control Office CTC Apparatus 53. This provides a conventional means for communication of designated controls for governing traffic from the control office to the respective ends of the passing sidings, and also provides means for the communication of indications from the field station locations to the control office indicative of the conditions of occupancy, the positions of the track switches, the conditions of the signals etc. Conventional detector track sections are provided for each of the track switches, such as the track section 54, for example, which is provided for the track switch at the left-hand end of the passing siding A.

A suitable Token Panel 55 is provided at the control office for the manual designation of the several rows on the Train Record Sheet which are to be used for recording the passage of the several vehicles which enter the territory for which the train recording system is provided. Token jacks on the Token Panel 55 are arranged in two laterally spaced columns, one column being for eastbound vehicles and another column being for westbound vehicles. The token jacks TJE1, TJE2 and TJE3 are provided for registration of the presence of eastbound vehicles, and the tokens TJW1, TJW2 and TJW3 are provided for registration of the presence of westbound vehicles. The number of token jacks provided for either direction of traffic is in accordance with the maximum number of eastbound or westbound vehicles that can be expected to occupy the territory for which the train recording system is provided at one time.

The tokens 56 (see FIG. 3) which are provided for insertion in the token jacks are coded so that a different code is set up by each of several tokens, when inserted in token jacks, corresponding to the several rows of spaces appearing on the Train Record Sheet. Thus, for example, if a new Train Record Sheet is to be provided each day, the number of tokens required would be in accordance with the number of vehicles that would be expected to pass through the territory during a day, and thus this would correspond to the number of rows to be used on the Train Record Sheet, one row being provided for each vehicle.

Stepping Switches For Tracking Vehicles are illustrated by the block 57 of FIG. 1. These stepping switches are associated with the several token jacks TJ on the Token Panel 55, one stepping switch being used for tracking the entire route of a vehicle through the territory, successive steps being taken as the vehicle progresses from station to station.

The Automatic Typewriter 50 is operated in accordance with a punched tape 58 which is fed into the Automatic Typewriter 50 from a suitable Tape Puncher 59. For recording the presence of a vehicle at a particular location, eight codes are successively punched on the tape 58 comprising respectively selected punchings in rows across the tape 58 as illustrated in FIG. 1. The first code punched is indicative of a start code for initiating the operation of the automatic typewriter apparatus, the second code is an identity code for selecting a row on the train record sheet corresponding to the vehicle to have its presence recorded, the third code is a station code which determines the particular column in which the arrival time is to be typed, and the subsequent codes are indicative of the time, switch position, and siding occupancy condition to be typed in a particular position which has been selected on the Train Record Sheet 51 by the preceding codes.

The punching of the row selection code is accomplished by Row Code Selection Apparatus 60 which is controlled in accordance with the identity code determined by a token 56 inserted in a token jack TJ, and thus associated with a stepping relay which has been actuated for registration of a vehicle into a particular location.

The column code punched in the tape is in accordance with the operation of Column Code Selection Apparatus 61 which is governed by the reception of an indication by OS Indication Relays 62 from a particular field station.

Codes for printing the time on the train record sheet are punched in the tape 58 in accordance with Time Code Selection Apparatus 63, which in turn is governed by a suitable Clock 64.

A code is punched on the tape 58 by the Tape Puncher 59 in accordance with the condition of the track switch and the condition of occupancy of a passing siding by Switch and Siding Occupancy Code Selection Apparatus 65. This apparatus 65 is controlled both by the Stepping Switches For Track Vehicles 57 and by Switch Indication Relays 66 in accordance with indications received via the centralized traffic control system from the different field stations.

Having thus considered the general organization of the system, consideration will now be given to typical detail apparatus provided for one embodiment of the present invention as is shown in FIGS. 2A through 2F. These circuits have been shown as typical for the purpose of simplifying the disclosure of the present invention as to its mode of operation rather than attempting to show the system complete, the detail circuit organization being shown more particularly as related to eastbound traffic. It is to be understood that similar apparatus is provided for the tracking of vehicles for westbound traffic.

Figure 2C:
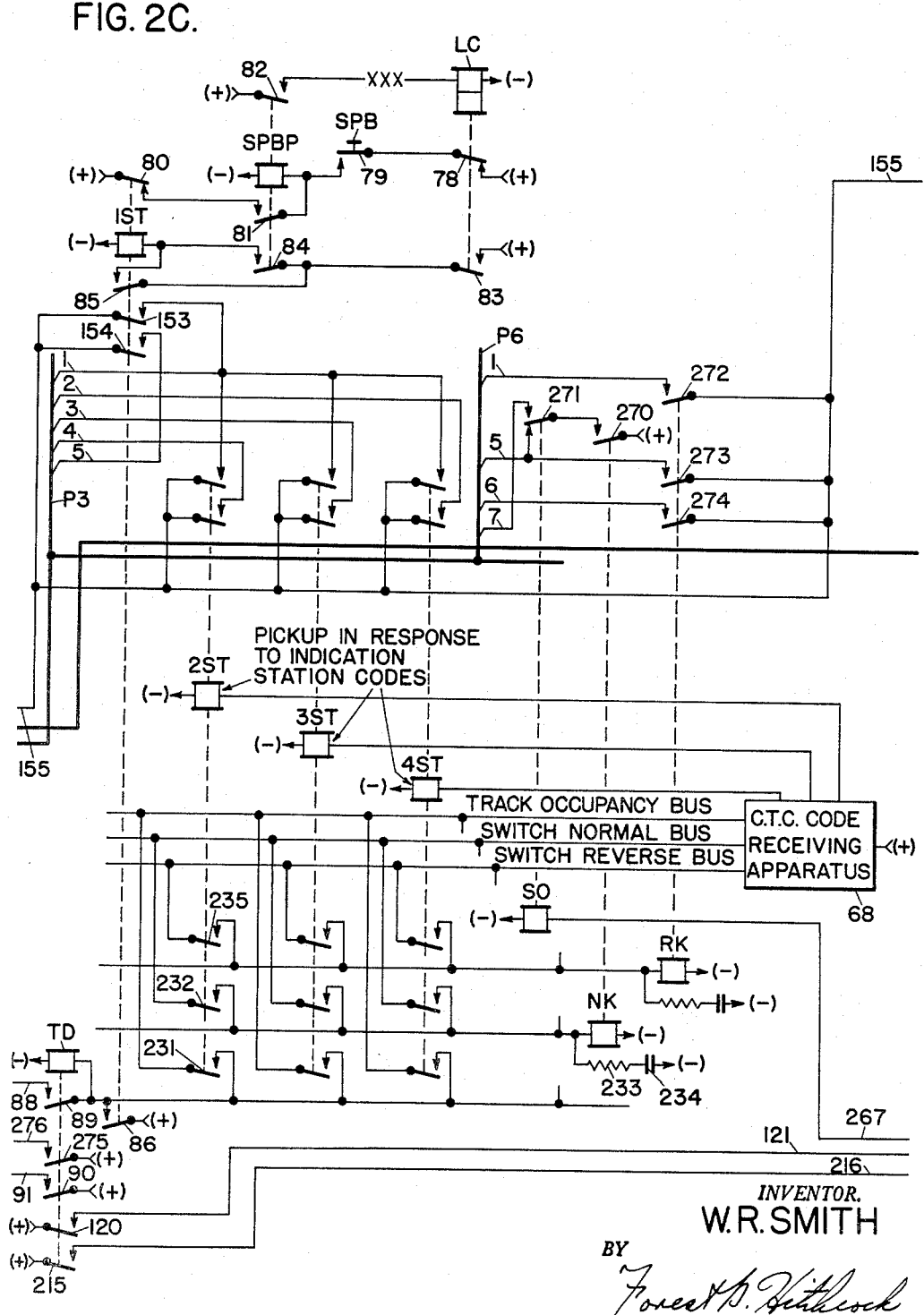
Figure 2E:
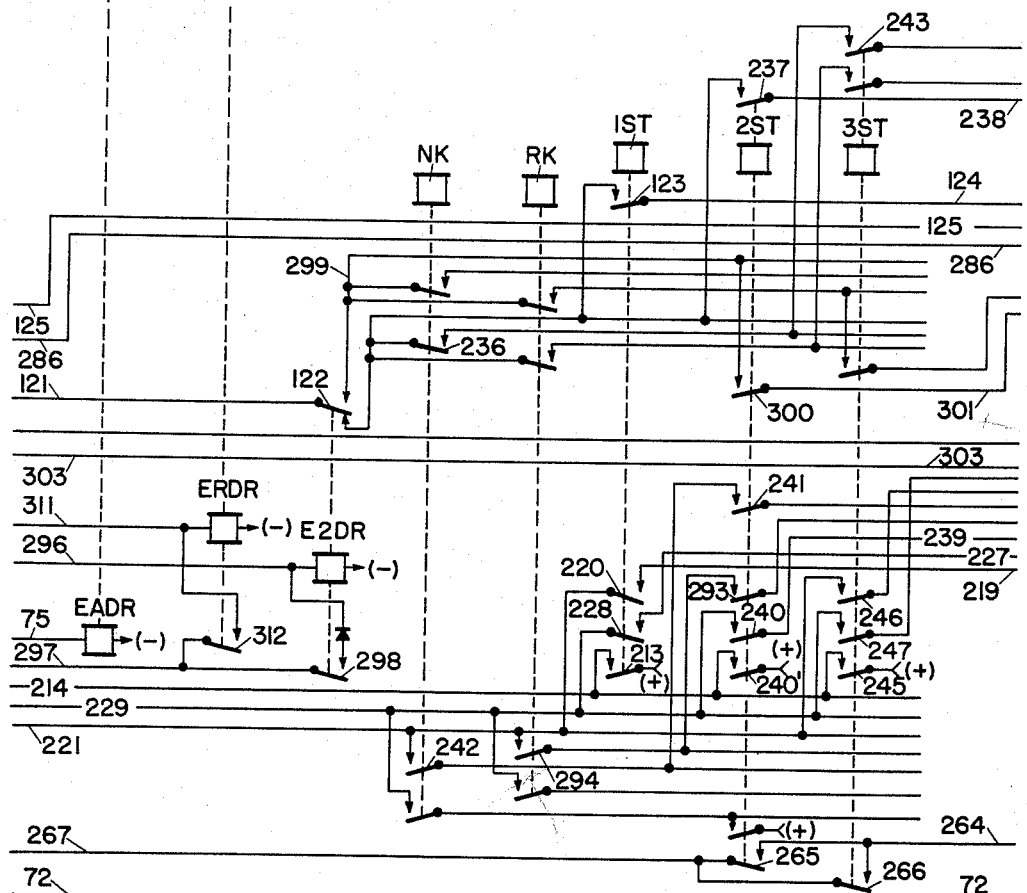

With reference to FIG. 2C, CTC code Receiving Apparatus 68 is illustrated as providing for the picking up of station relays 2ST, 3ST and 4ST in response to indication station codes from the respective field station Nos. 2, 3 and 4. This apparatus is also illustrated as providing energization for a Track Occupancy Bus, a Switch Normal Bus and a Switch Reverse Bus from which normal and reverse switch indication relays NK and RK can be selectively energized. A track-down relay TD is provided for energization from the Track Occupancy Bus whenever an indication is received that a detector track section at any one of the field stations has become occupied by a vehicle.

In addition to the station relays 2ST, 3ST and 4ST, a station relay 1ST is provided for use in setting up the entrance of a vehicle into the territory, this relay being subject to energization by the actuation of a push button SPB and an associated push button repeater relay SPBP. There is also provided an associated location relay LC which is used to initiate the code communication system into a cycle of operation upon designation of the identity of a vehicle entering the territory so as to effectively provide a lockout to prevent the possibility of information being fed into the tape puncher simultaneously from a number of different stations. In other words, the system is provided in such a manner that the punching of a tape is rendered effective while a cycle of operation of the code communication system of the CTC apparatus is in progress, such CTC apparatus being operable to prevent interference between stations having indications to be transmitted at the same time by causing the indications from the several field stations to be transmitted successively in a predetermined order during separate cycles of operation of the normally at rest code communication apparatus. A slow drop away relay SB (see FIG. 2B) is picked up whenever the code communication system is in a cycle of operation, it being maintained steadily energized until the end of the cycle.

Typical stepping relays, or switches, for tracking eastbound vehicles 1ESP and 2ESP are shown in FIG. 2F, these relays being associated with the token jacks TJE1 and TJE2 respectively (see FIGS. 1 and 2D). Each of these stepping relays is used to track the passage of a vehicle throughout the right-of-way after the vehicle has had its presence registered as having entered the territory for which the recording system is provided. Each of these stepping relays is illustrated as having thirty steps, and it is actuated one step for each period of energization of its winding. A relay ESPP is provided to indicate when any of the stepping relays ESP is energized. This relay is normally energized but is dropped away when any one of the relays ESP is energized.

Associated with the control of the stepping switches are stepping control relays EP and ERP (see FIG. 2D) and occupancy storage repeater relays ERO1, ERO2, ERO3, EADR, ERDR and E2DR.

With reference to FIG. 2F, a homing relay H is provided for use in resetting each of the stepping relays ESP. A relay CK is provided for checking that the position called for for a stepping switch has been obtained.

A bank of punch control relays P (see FIG. 2A) is provided for governing the sequence of punching by the tape puncher. This bank of relays comprises relays P1–SW, P2–ID, P3–LO, P4–TH, P5–TH, P6–M, P7–TM, P8–TM and PP.

Apparatus for selecting time codes to be punched on the tape is illustrated in FIG. 2B as comprising a synchronous motor CM which drives a cam CM1 so as to actuate the contact 69 once every minute. A relay TEP directly repeats the contact 69. Stepping switches T1, T2 and T3 are provided for counting the actuations of the relay TEP, the stepping switch T1 being stepped one step for each actuation of the relay TEP, the stepping switch T2 being actuated one step for each ten actuations of the relay TEP, and the stepping switch T3 being actuated one step for every sixty actuations of the relay TEP. The stepping switches T1 and T2 can be of the same type as has been described for use for tracking the passage of vehicles, each stepping switch having thirty steps, while the stepping switch T3 is of a similar type but having only fifteen steps. Contacts of these stepping switches are used to select the time codes to be punched by the tape puncher.

Having thus described the general organization of the apparatus for one embodiment of the present invention, more detailed consideration as to the detail circuits involved will be given relative to considering typical operating conditions of the system.

Operation

The condition of the apparatus as illustrated in FIGS. 2A through 2F is assumed to be that where no vehicles are present in the territory for which the recording system is provided and all of the tracking stepping switches SP have been operated to their homing (step 30) positions. Under these conditions the relay ESPP (see FIG. 2D) is in its energized position because it repeats the homing positions of all of the stepping relays ESP. Thus this relay is energized through back contacts 70 and 71 of stepping switches 2ESP and 1ESP respectively (see FIG. 2F) and wire 72. The energization of this relay provides that the relay EADR (see FIG. 2E) is energized by a circuit including front contact 73 of relay ESPP (see FIG. 2D) back contact 74 of occupancy storage repeater relay ERO1 and wire 75. With reference to FIG. 2F, the relay E1, which repeats the homing relays in their normal positions is maintained normally energized by a stick circuit including front contact 76 of relay ESPP and front contact 77 of relay E1.

To consider the mode of operation of the system upon the passage of a vehicle, it will be assumed that an eastbound vehicle is to enter the right-of-way for which the recording system is provided. To register the presence of the vehicle in the system, the operator at the control office selects a token such as the token 56 shown in FIG. 3 for insertion in one of the token jacks for eastbound vehicles. The token that he selects will preferably be one that has a code set up by the position of cams 117 in the token 56 to provide a code for the third row shown on the Train Record Sheet 51 of FIG. 1, because that is the next row on the Train Record Sheet 51 that is available for typing the record of the progress of a vehicle. In other words, the operator is assumed to have token 56 which have codes set up therein corresponding to codes required to operate the Automatic Typewriter 50 to positions for the several rows that are ruled on the train record sheet 51, and although the code to be set up by the token 56 can be considered as being indicative of a particular vehicle because it is used to designate the row in which a particular vehicle has its record type, it is also indicative of a particular row on the Train Record Sheet 51.

The operator at the control office inserts the token 56 in any one of the token jacks TJ on the Token Panel 55 for the particular direction of traffic to be established, and he will normally insert the token in the first token jack that does not already have a token inserted in it in the vertical row of token jacks TJ for a particular direction of traffic. Thus if it is assumed that the vehicle approaching is an eastbound vehicle, the operator can insert a token 56 having a code corresponding to the third row on the Train Record Sheet 51 into the token jack TJE1 on the Token Panel 55 (see FIG. 1).

Having thus selected the stepping switch 1ESP (see FIG. 2F) by the insertion of the token 56 into the token jack TJE1, the operator then actuates a start push button SPB (see FIG. 2C) for initiating registration on the Train Record Sheet 51 of the vehicle entering the territory. This causes the picking up of relay SPBP by the energization of a circuit including back contact 78 of relay LC and contact 79 of push button SPB in its depressed position. The picking up of relay SPBP closes a stick circuit for that relay including back contact 80 of relay 1ST and front contact 81 of relay SPBP. The picking up of relay SPBP causes the picking up of the relay LC to initiate a cycle of the code communication apparatus in accordance with the closure of front contact 82. Relay LC is maintained picked up throughout the cycle of operation of the code communication apparatus according to usual CTC practice by the energization of a circuit (not shown) for its lower winding.

The picking up of relay LC causes the picking up of the station relay 1ST for the entering location of the vehicle by the energization of a circuit including front contact 83 of relay LC and front contact 84 of relay SPBP. When relay 1ST is picked up, the relay SPBP becomes dropped away by the opening of its stick circuit at back contact 80, but relay 1ST is maintained picked up by a stick circuit including front contact 85 which is connected in multiple with front contact 84 of relay SPBP. The picking up of relay 1ST causes the picking up of relay TD by the closure of an obvious circuit for this relay at front contact 86, and relay TD is maintained picked up throughout the cycle of operation of the code communication apparatus by a stick circuit including front contact 87 of relay SB (see FIG. 2B) wire 88 and front contact 89 of relay TD.

The picking up of relay TD initiates the operation of the tape puncher by providing energy for picking up the relay P1–SW (see FIG. 2A) to punch a start code on the tape. The circuit by which the relay P1–SW is energized at this time includes front contact 90 of relay TD (see FIG. 2C), wire 91, and back contacts 92, 93, 94, 95, 96, 97 and 98 of relays P8–TM, P7–TM, P6–M, P5–TH, P4–TH, P3–LO and P2–ID respectively. A stick circuit is momentarily established upon the picking up of this relay for the energization of its lower winding including front contact 90 of relay TD (see FIG. 2C), wire 91, back contact 99 of relay PP and front contact 100 of relay P1–SW.

Also at this time, the relay PP becomes picked up by the energization of a circuit including front contact 90 of relay TD (see FIG. 2C), wire 91, contactor 101 of the mechanism of the tape puncher and back contact 102 of relay P8–TM. This relay is maintained picked up until the contactor 101 of the tape puncher is rotated to a position where the contact strip 103 on the outside of the contactor opens the circuit. This contact strip maintains a contact closed only for approximately 240° of rotation of the contactor 101. Thus the relay PP is pulsed during the punching of the tape at a regular rate determined by the contactor 101 of the tape puncher. When the relay PP becomes picked up, a circuit is closed for energization of control wires C2, C3 and C4 for punching holes in the tape corresponding positions. The solenoid for punching a hole in the second position across the tape is energized in accordance with the application of energy to wire C2 through front contact 104 of relay PP, back contacts 105, 106, 107, 108, 109, 110 and 111 of relays P8–TM, P7–TM, P6–M, P5–TH, P4–TH, P3–LO and P2–ID respectively, front contact 112 of relay P1–SW and front contact 113 of relay P1–SW. Similarly the code wires C3 and C4 are energized for actuation of their associated punching solenoids through front contacts 114 and 115 respectively.

When the relay PP becomes dropped away by the opening of its circuit by the contactor 101, the relay P2–ID becomes picked up by the energization of a circuit including front contact 90 of relay TD (see FIG. 2C), wire 91, back contact 99 of relay PP, front contact 100 of relay P1–SW and front contact 116 of relay P1–SW. Upon the picking up of this relay, a stick circuit is established extending from wire 91 through back contacts 92, 93, 94, 95, 96 and 97 of relays P8–TM, P7–TM, P6–M, P5–TH, P4–TH and P3–LO respectively, and front contact 98 of relay P2–ID.

The relay PP becomes picked up to execute the second punching of the tape in accordance with code selected upon the picking up of relay P2–ID in a manner similar to that which has been described, and a code characteristic of the row on the Train Record Sheet 51 that has been selected by the token that has been inserted in a jack TJ in the Token Panel 55 is fed into the tape puncher.

If the token for designating the presence of the vehicle entering the territory has been inserted in the jack TJE1 (see FIG. 1), for example, the relay 1EP (see FIG. 2D) becomes picked up in accordance with the closure of the switch contact 118. This contact is closed upon insertion of a token 56 into the token jack TJE1, and it is provided that this switch contact 118 may be opened by the operator, if he wishes to prevent further registration in response to the passage of a train, by the rotation of the knob 119 at the end of the token (see FIG. 3). The circuit by which the relay 1EP is picked up at this time includes front contact 120 of relay TD (see FIG. 2C), wire 121, back contact 122 of relay E2DR, front contact 123 of relay 1ST, wire 124, contact 30 of stepping switch 1ESP, wire 125, token contact 118 and upper winding of relay 1EP. This relay when picked up is maintained energized by a stick circuit for its lower winding including front contact 120 of relay TD, wire 121, and front contact 126 of relay 1EP. The closure of front contacts 127, 128, 129, 130, 131, 132, 133 and 134 connects contacts 135, 136, 137, 138, 139, 140, 141 and 142 of the token jack TJE1 to wires 1, 2, 3, 4, 5, 6, 7 and 8 respectively which are associated with the reference line P2 and which are connected to front contacts 143, 144, 145, 146, 147, 148, 149 and 150 (see FIG. 2A) respectively of the row punch relay P2–ID. The front contacts 143 through 150 connect selected energy to the tape punching solenoid control wires C1 to C8 respectively to provide for the punching of a row code as the second code during the cycle to be punched on the tape by the tape puncher. The holes actually punched for this code correspond to the contacts of the token jack TJE1 that are closed, and the particular contacts that are closed are dependent upon the token 56 that has been selected. This token has a particular distinctive combination of positions of cams such as the cams 117 of the token 56 shown in FIG. 3.

After there has been time for the tape to be punched as has been described, the relay PP becomes dropped away, and the dropping away of this relay permits the picking up of the relay P3–LO for selecting the punching of a code characteristic of the location of the vehicle which is to have its arrival time registered on the Train Record Sheet 51. The circuit by which the relay P3–LO is picked up includes front contact 90 of relay TD (see FIG. 2C), wire 91, back contact 99 of relay PP, back contact 100 of relay P1–SW, front contact 151 of relay P2–ID, and lower winding of relay P3–LO. A stick circuit which maintains the relay P2–ID picked up is opened at back contact 97 upon the picking up of relay P3–LO, but the relay P2–ID is maintained energized through front contact 152 until the picking up of relay PP when its control circuit is again closed by the contactor 101.

The location code to be punched in the tape is selected by the particular station relay that is picked up, and in this case, for registration of an eastbound vehicle into the right-of-way, it is selected by the relay 1ST (see FIG. 2C). Thus it is provided that the station control code is selected by energization of wires 1 and 5 associated with reference line P3 in accordance with energy feeding through front contacts 153 and 154 respectively. The time of energization for actuation of the punching solenoids is determined by a network of contacts of the punch control relays P wherein energy is applied to a punch energy bus 155 through front contact 104 of relay PP, back contacts 105, 106, 107, 108 and 109 of relays P8–TM, P7–TM, P6–M, P5–TH and P4–TH, front contact 156 of relay P3–LO, back contact 157 of relay P2–ID and back contact 112 of relay P1–SW. Energization of the bus 155 at this time is rendered effective when the relay P2–ID becomes dropped away upon the opening of its stick circuit at back contact 99 of relay PP.

In accordance with the application of energy to the code wires 1 and 5 associated with the reference line P3 (see FIGS. 2A and 2C), energy is applied to the wires C1 and C5 for energization of the punch solenoids associated with the second and fifth positions across the tape through front contacts 158 and 159 respectively of relay P3–LO.

The relay PP next becomes dropped away to close a pick-up circuit for the relay P4–TH to select the next code to be punched on the tape. The relay P3–LO is maintained picked up at this time by stick circuits including front contact 97 of relay P3–LO and front contact 159 of relay P3–LO respectively. The circuit for the energization of relay P4–TH at this time includes front contact 90 of relay TD (see FIG. 2C), wire 91, back contact 99 of relay PP, back contact 152 of relay P2–ID, front contact 160 of relay P3–LO, and lower winding of relay P4–TH. When the relay P3–LO becomes dropped away upon the picking up of relay PP and after the relay P4–TH has been picked up, a circuit is closed through front contact 161 of relay P4–TH to energize the punch energy bus 155 which feeds through contacts of the stepping relay T3 (see FIG. 2B) to selectively punch a code on the tape indicative of time in hours as counted by the stepping relay T3. The mode of operation of the stepping relays in accordance with time will be hereinafter considered more in detail, but for the present it is believed sufficient to assume that the stepping relay T3 assumes a particular position in accordance with the number of hours counted, and such position selects a code in accordance with the particular step to which the stepping relay T3 is operated for the selective energization of wires 1 and 5 associated with the reference line P4, the energy for these wires being obtained from the bus 155 and selected through movable contact 162 of the stepping relay T3. Energy applied to these wires is connected through front contacts 163 and 164 respectively of relay P4–TH to the solenoid punch control wires C1 and C5. This is the punching of a code for the tens digit of the hour designation, and the punching is rendered effective after the picking up of the relay PP.

Relay P4–TH is maintained picked up by stick circuits including front contact 96 of relay P4–TH and front contact 165 of relay P4–TH. The relay P5–TH is picked up upon the dropping away of relay PP for punching the units digit of the number corresponding to the time in hours to be registered on the train record sheet 51. The circuit for the energization of relay P5–TH extends through front contact 90 of relay TD (see FIG. 2C), wire 91, back contact 99 of relay PP, back contact 159 of relay P3–LO, front contact 166 of relay P4–TH and lower winding of relay P5–TH. When relay PP becomes picked up again, the relay P4–TH becomes dropped away because of the opening of its stick circuit at back contact 99, and energy is applied to the punch power bus 155 through front contact 167 of relay P5–TH and back contact 161 of relay P4–TH.

The picking up of relay P5–TH applies a selected time code for printing the units digit of the hours on the Train Record Sheet 51 in accordance with the closure of front contacts 170, 171, 172, 173, 174 and 175. The selection of energy to be applied through these contacts to the solenoid control wires C1 through C6 selectively is selected by the position of movable contactors 176, 177 and 178 (see FIG. 2B) of the hour counting stepper relay T3, energy being selectively applied to wires 1, 2, 3, 4, 5 and 6 which are associated with the reference line P5.

The next code to be punched on the tape is a code indicative of the switch position and occupancy condition of the passing siding. For the condition that is being assumed at present, however, for setting up a registration of a vehicle as entering the territory, there is no track switch involved, and thus there is no code punched for the sixth position on the tape. The relay P6–M, however, is picked up the next time that the relay PP is dropped away to close back contact 99 by the energization of a circuit including back contact 165 of relay P4–TH and front contact 168 of relay P5–TH and the lower winding of relay P6–M. This relay when picked up is maintained energized by a stick circuit including front contact 94 of relay P6–M and another stick circuit including front contact 169 of relay P6–M.

The picking up of relay PP after the picking up of relay P6–M causes the dropping away of relay P5–TH, and at this time energy is applied to the punch energy bus 155 through front contact 179 of relay P6–M. The picking up of relay P6–M closes the front contacts 180, 181, 182 and 183 for applying a selected code to the solenoid wires C1, C5, C6 and C7 respectively. The code selected for application to these wires is in accordance with the condition of energization of the relays NK, RK and SO of FIG. 2C, but inasmuch as these relays are all in their dropped away positions under the assumed condition, there is no energy applied to the wires 1, 5, 6 and 7 which are associated with the reference line P6, and therefore there is no punching of the tape for the position six in setting up the initial registration of the time of entrance of a vehicle into the territory.

After the relay PP has become dropped away at the end of the period for punching the sixth code on the tape, the relay P7–TM is picked up for selecting the application of a code to the tape puncher for punching the tens digit of the code for printing the number of minutes on the Train Record Sheet 51. Relay P7–TM is picked up under these conditions, through a circuit including front contact 90 of relay TD (see FIG. 2C), wire 91, back contact 99 of relay PP, back contact 184 of relay P5–TH, front contact 185 of relay P6–M and lower winding of relay P7–TM. The picking up of this relay establishes stick circuits at its front contacts 93 and 186. The relay P6–M becomes dropped away upon the picking up of relay PP, and energy is applied to the punch bus 155 through front contact 187 of relay P7–TM and back contact 179 of relay P6–M. The closure of front contacts 188, 189, 190, 191 and 192 of relay P7–TM connects wires 1, 2, 3, 5 and 6 associated with the reference line P7 respectively to solenoid control wires C1, C2, C3, C5 and C6 for punching a code in the tape in accordance with energy selectively applied to these wires indicative of the time registered by the clock mechanism and particularly by the stepping relay T2 of FIG. 2B. Thus energy is applied selectively to the different code wires 1, 2, 3, 5 and 6 associated with the reference line P7 in accordance with the time registered in minutes and in accordance with the positions of the movable contactors 193, 194 and 195 of the stepping relay T2.

The next time the relay PP becomes dropped away, the relay P8–TM becomes picked up by the energization of a circuit including front contact 90 of relay TD (see FIG. 2C), wire 91, back contact 99 of relay PP, back contact 169 of relay P6–M, front contact 196 of relay P7–TM and lower winding of relay P8–TM. This relay is maintained picked up by a stick circuit including its front contact 92 until the relay TD becomes dropped away at the end of the communication cycle upon the dropping away of the slow acting relay SB. Relay P7–TM becomes dropped away when the relay PP becomes picked up, and energy is applied to the punch bus 155 through front contact 197 of relay P8–TM and back contact 187 of relay P7–TM. The picking up of relay P8–TM connects wires 1 through 6 associated with the reference line P8 to the solenoid punch code wires C1 through C6 respectively in accordance with the closure of front contacts 198, 199, 200, 201, 202 and 203 respectively. Energy is selectively applied to these code wires in accordance with the condition of the stepping relay T1 which is used for counting up to ten minutes, the codes being selected in accordance with the position of the movable contactors 204, 205 and 206.

Having thus completed the punching of the tape 58, the tape 58 is fed into the Automatic Typewriter 50 and operates the typewriter successively in accordance with the respective codes that have been punched on the tape 58. Thus the Automatic Typewriter 50 positions the Train Record Sheet 51 to a row corresponding with the code punched on the tape indicative of the token code of the token 56 that has been inserted in the token jack TJE1. The following code on the punched tape 58 actuates the Train Record Sheet 51 in the Automatic Typewriter 50 to a particular row position corresponding to the station No. 1 for registration of entry of the vehicle into the right-of-way, and the subsequent codes provide for the typing in the space that has been selected by the prior codes on the Train Record Sheet 51 of the particular time in hours and minutes indicative of the time of registration of the vehicle into the stretch of right-of-way illustrated in FIG. 1. When the communication cycle of the CTC system is completed, the relay SB of FIG. 2B is dropped away, and the dropping away of that relay deenergizes the stick circuit for the relay TD by the opening of front contact 87 so that the relay TD becomes dropped away to remove energy from the circuits that have been described for control of the tape puncher.

It is to be understood that the mode of operation in the control of the Tape Puncher 59 that has been described for one cycle of operation to register an arrival time of a vehicle on the Train Record Sheet 51 is typical of the mode of operation that is effective each time a vehicle enters a particular zone or track section which is used to indicate its presence and to initiate the operation of the Tape Puncher 59 to punch a series of codes corresponding to the series of codes that has been described during a typical operating cycle. It is to be further understood that a similar mode of operation is effective in punching the tape to register the presence of a westbound vehicle as it progresses along the right-of-way. The circuits which are shown in detail for operating the Tape Puncher 59 for the passage of an eastbound train are thus to be considered as typical of the circuits that are also provided but are not shown in detail for punching the tape to register the presence of a westbound vehicle at the various field stations as the vehicle progresses.

*Tracking.*—The manner in which the steps of each of the eastbound stepper relays are assigned for storage of the presence of a vehicle in different sections of the right-of-way is illustrated by step numbers associated with the track diagram in FIG. 1. Thus the steps 3 and 4 are associated for storage of the presence of vehicles in the passing siding A and step No. 5 is used for registering the storage of a vehicle on the main track associated with passing siding A. The steps 6 and 7 are used for storage of the presence of vehicles in the block between passing sidings A and B, and the steps 8 and 9 are used for registering the presence of vehicles in the passing siding B. Step 10 is used for registering the presence of an eastbound vehicle in the stretch of main track associated with the passing siding B, and steps 11 and 12 are used for registering the presence of vehicles in the stretch of track extending beyond the passing siding B. It is to be understood that in a similar manner steps are assigned for tracking westbound vehicles along the right-of-way, the steps being numbered for the different zones along the right-of-way in an order starting from the right-hand end of the stretch of track as illustrated in FIG. 1 and progressing in a manner corresponding to that which has been illustrated on the track diagram as being used in the assignment of steps for the passage of eastbound vehicles.

In accordance with the station relay 1ST having been picked up as heretofore described, and the relay 1EP (see FIG. 2D) having been energized, the stepping relay 1ESP is actuated to step No. 2 for registering the presence of the eastbound vehicle in approach of the passing siding A. The stepping relay 1ESP is energized upon the picking up of the relay 1EP (see FIG. 2D) by a circuit including front contact 207 of relay EADR, wire 208, front contact 209 of relay 1ST, front contact 210 of relay 1EP, wire 211, contact 212 of stepping relay 1ESP and winding of stepping relay 1ESP. This actuates the stepping relay 1ESP from its step 30 to step No. 1.

The energization of the stepping relay 1ESP opens back contact 71 in the control circuit for the relay ESPP (see FIG. 2D) to cause the dropping away of this relay. The dropping away of relay ESPP opens the circuit for the energization of relay EADR (see FIG. 2E) at front contact 73 and thus causes the dropping away of this relay. The dropping away of relay EADR opens the circuit that has been described for the energization of the stepping relay 1ESP at front contact 207, and thus causes the deenergization of relay 1ESP and the closure of its back contact 71 in the circuit for relay ESPP so that the relay ESPP again becomes picked up.

The step counter relay ERO3 (see FIG. 2D) becomes picked up in response to the picking up of the station relay 1ST, and thus the relay ERO3 is in its picked up position at this time. The circuit for the energization of relay ERO3 includes front contact 213 of relay 1ST (see FIG. 2E) and wire 214. This relay when picked up is maintained energized by a stick circuit as long as the relay TD is maintained picked up, including front contact 215 of relay TD (see FIG. 2C), wire 216 and front contact 217 of relay ERO3. In accordance with the stepping relay 1ESP having been operated to its first step position, a circuit is closed for picking up relay ERO1 including movable contactor 218 (see FIG. 2F) of the stepping relay 1ESP, wire 219, front contact 220 of relay 1ST and wire 221. Relay ERO1 is maintained picked up by a stick circuit including front contact 215 of relay TD (see FIG. 2C), wire 216 and front contact 222 of relay ERO1.

In accordance with the relay ESPP having been picked up, the relay EADR is again energized to advance the stepping switch 1ESP to the second step by the energization of a circuit including front contact 73 (see FIG. 2D) of relay ESPP, front contact 74 of relay ERO1, back contact 223 of relay ERO2 and wire 75. With relay EADR in its picked up position, the stepping relay 1ESP is energized for a second time by a circuit including front contact 207 of relay EADR, front contact 224 of relay 1EP, back contact 225 of relay 1ERP and contact 226 of relay 1ESP. The energization of relay 1ESP opens back contact 71 and thus causes the dropping away of relay ESPP (see FIG. 2D), and the dropping away of relay ESPP causes the dropping away of relay EADR by opening its circuit at front contact 73. The dropping away of relay EADR deenergizes the stepping relay 1ESP, and thus causes the back contact 71 of relay 1ESP to be again closed and thus the relay ESPP is again picked up.

The picking up of the relay ESPP after operating the stepping switch 1ESP to its second step position, however, does not cause another step to be taken because the relay ERO2 (see FIG. 2D) is picked up during the second step by the energization of a circuit including movable contactor 218 of stepping switch 1ESP (see FIG. 2F), wire 227, front contact 228 of relay 1ST and wire 229. This relay is maintained picked up by a stick circuit including front contact 215 of relay TD (see FIG. 2C), wire 216 and front contact 230 of relay ERO2. Thus the relays ERO1, ERO2 and ERO3 are all in their energized position, and there is no circuit closed for the energization of relay EADR as would be required for the actuation of the stepping relay 1ESP to take another step.

There is no further actuation of the stepping relay 1ESP during this particular cycle of operation of the system under consideration, and thus the relays 1EP, ERO1, ERO2 and ERO3 remain in their energized positions because their stick circuits are dependent upon the closure of front contact 215 of relay TD until the relay TD is dropped away as has been heretofore considered upon the dropping away of the slow acting relay SB (see FIG. 2B) at the end of the CTC cycle of operation. Thus when the cycle of operation is completed and the relay SB becomes dropped away, the relays TD, 1EP, ERO1, ERO2 and ERO3 become dropped away, and upon the restoration of these relays to their normally deenergized positions, the relay EADR is again picked up by the energization of a circuit that has been described, but the picking up of this relay cannot cause any further actuation of the stepper 1ESP because of the relay 1EP having been dropped away.

To consider further actuation of the stepping relay 1ESP, it will be assumed that the vehicle enters the detector track section 54 (see FIG. 1) at the left-hand end of the passing siding A, with the track switch in its normal position and with the passing siding A unoccupied. Under these conditions, the stepping relay 1ESP is actuated to its step No. 5 for registration of the presence of the vehicle in the area on the main track associated with the passing siding A, steps No. 3 and No. 4 being reserved for storing presence of vehicles in the sliding A.

Upon the reception by the CTC code Receiving Apparatus 68 (see FIG. 2C) of an indication that the track section 54 (see FIG. 1) has become occupied by a vehicle, the station relay 2ST is picked up and the picking up of this relay causes the picking up of relay TD by the energization of a circuit including front contact 231 of relay 2ST. This circuit is energized in accordance with the reception of an OS indication by the CTC Code Receiving Apparatus 68 according to the usual mode of operation in centralized traffic control systems. Relay TD is maintained picked up throughout the indication cycle of the CTC apparatus in accordance with the energization of the relay SB (see FIG. 2B) in a manner which has been heretofore described. Inasmuch as it assumed that the track switch at the left-hand end of the passing siding A is in its normal position, the indication received relative to the position of the track switch energizes the Switch Normal Bus (see FIG. 2C) and thus the relay NK is picked up by energy from this bus through front contact 232 of relay 2ST. This relay is made slow to drop away by shunting its winding with a resistor 233 in series with a capacitor 234. If the track switch would have been operated to its reverse position for the operation of the vehicle into the passing siding, the relay RK would have been energized rather than the relay NK from the Switch Reverse Bus through front contact 235 of relay 2ST.

Relay 1EP (see FIG. 2D) is picked up for permitting operation of the stepping relay 1ESP by the energization of a circuit including front contact 120 of relay TD (see FIG. 2C), wire 121, back contact 122 of relay E2DR, front contact 237 of relay 2ST, wire 238, movable contactor 239 of stepping switch 1ESP, wire 125, contact 118 and upper winding of relay 1EP. This relay is maintained picked up for the cycle of operation of the code communication system by the energization of a stick circuit that has been described.

Upon the picking up of relay 1EP, the winding of relay 1ESP (see FIG. 2F) is energized to actuate the stepper to step No. 3, and, upon the energization of the stepping relay 1ESP, its back contact 71 is opened and the relay ESPP (see FIG. 2D) becomes dropped away. The dropping away of relay ESPP in turn causes the dropping away of relay EADR by opening its circuit at front contact 73 (see FIG. 2D), and the dropping away of relay EADR (see FIG. 2E) causes the deenergization of the stepping relay 1ESP by opening its circuit at front contact 207.

The relay 1ESP is thus stepped to its third step, and the relay ERO2 (see FIG. 2D) becomes picked up by the energization of a circuit including movable contactor 218 (see FIG. 2F) of stepping relay 1ESP in the No. 3 step position, wire 239, front contact 240 of relay 2ST and wire 229. This relay is maintained picked up until the end of the cycle by a stick circuit that has been described. The relay ER03 is picked up upon the closure of front contact 240' of relay 2ST.

The relay ERO1 still remains in its dropped away position so that the relay EADR becomes picked up to cause another step to be taken by the energization of a circuit including front contact 73 of relay ESPP, back contact 74 of relay ERO1 and wire 75. The closure of front contact 207 of relay EADR energizes the relay 1ESP to actuate the stepper to step No. 4, and in accordance with such energization, the opening of back contact 71 of the stepping relay 1ESP causes the relay ESPP to be dropped away and to in turn cause the dropping away of relay EADR and the deenergization of the stepping switch 1ESP. There is no step counting relay ERO picked up at this time, and thus when the relay ESPP becomes again picked up, the relay EADR is again energized to cause actuation of the stepping relay 1ESP to step No. 5.

The relay ESPP becomes picked up upon the deenergization of the stepping relay 1ESP, and in turn causes the picking up of the relay EADR to apply energization to the stepping relay 1ESP for actuation of that relay to step No. 5. Relay EADR is energized at this time through front contact 73 of relay ESPP, back contact 74 of relay ERO1 and wire 75. Thus the stepping relay 1ESP becomes actuated to step No. 5 and the opening of back contact 71 of the stepping relay 1ESP causes the dropping away of the relays ESPP and EADR, thus deenergizing the winding of the stepping relay 1ESP.

Upon actuation of the stepping switch 1ESP to step No. 5, a circuit is closed for the energization of the step counting relay ERO1 (see FIG. 2D) including movable contactor 218 of stepping relay 1ESP in the step No. 5 position, front contact 241 of relay 2ST, front contact 242 of relay NK and wire 221. It is now provided that the relays ERO1, ERO2 and ERO3 are all energized, and because of the energization of all of these relays, the picking up of the relay ESPP after deenergization of the stepping relay 1ESP cannot be effective to initiate actuation of the stepping relay 1ESP to the next step. Thus the stepping is stopped for the stepping switch 1ESP in accordance with energization of relay 2ST. The stopping of the stepping switch 1ESP on step No. 5 indicates that the vehicle has enetered the stretch of main track associated with the passing siding A. This storage is maintained until the vehicle proceeds to the point of entering the OS track section at the right-hand end of the passing siding A.

Thus there is no further actuation of relays during the indication cycle of operation that has been under consideration, and when the cycle of operation is completed of the CTC apparatus, the relay SB (see FIG. 2B) becomes dropped away, and the dropping away of this relay causes the restoration to normal conditions of the relays TD, 1EP, ERO1, ERO2, ERO3 and EADR as has been heretofore considered upon the ending of a cycle of operation of the CTC code communication apparatus.

As the vehicle progresses further so as to enter the OS track section at the right-hand end of the passing siding A, an indication is transmitted to the control office that such OS track section has been entered, and energy is applied by the CTC Code Receiving Apparatus 68 (see FIG. 2C) to the Track Occupancy Bus and to the Switch Normal Bus during a cycle of operation for the reception of indications. The relays TD and NK become picked up by a mode of operation corresponding to that which has been heretofore considered, and the relay 1EP (see FIG. 2D) becomes picked up again for initiating further actuation of the stepping relay 1ESP. A circuit by which the relay 1EP is energized at this time includes front contact 120 of relay TD (see FIG. 2C), wire 121, back contact 122 of relay E2DR, front contact 236 of relay NK, front contact 243 of relay 3ST, movable contactor 239 of relay 1ESP and step No. 5 position, wire 125 and token switch contact 118. Upon the picking up of relay 1EP, the stepping relay 1ESP is actuated to step No. 6 in accordance with the energization of its winding by a circuit including front contact 207 of relay EADR, front contact 224 of relay 1EP, back contact 225 of relay 1ERP, wire 244 and contact 226 of the stepping relay 1ESP. Relay ESPP becomes dropped away and in turn causes the dropping away of relay EADR according to a mode of operation that has been described to deenergize the stepping relay 1ESP after the stepping relay 1ESP has been actuated to step No. 6.

The picking up of relay 3ST upon reception of indications from field station No. 3 causes the picking up of the step counting relay ERO3 by the energization of this relay through front contact 245 of relay 3ST and wire 214. After step No. 6 has been taken, the relay ERO1 becomes picked up by the energization of a circuit including movable contactor 218 (see FIG. 2F) of stepping relay 1ESP in step No. 6 position, front contact 246 of relay 3ST and wire 221. The relay ERO2 is still in its deenergized position, however, and thus the relay EADR becomes picked up upon the picking up of relay ESPP by the energization of a circuit including front contact 73 of relay ESPP, front contact 74 of relay ERO1, back contact 223 of relay ERO2 and wire 75.

The closure of front contact 207 of relay EADR advances the stepping relay 1ESP to step No. 7, and the opening of back contact 71 of stepping relay 1ESP causes the relay ESPP to again be dropped away and to cause the deenergization of relay EADR which in turn deenergizes the stepping relay 1ESP. The stepping is stopped on step 7 because of the energization of the last of the step counting relays ERO2 by a circuit including movable contactor 218 (see FIG. 2F) of stepping relay 1ESP at Step No. 7, front contact 247 of relay 3ST and wire 229. With relays ERO1, ERO2 and ERO3 all in their picked up positions there can be no further energization of relay EADR during the cycle of operation, and thus the indication cycle progresses with no further actuation of the tracking apparatus. Upon termination of the cycle, the relay SB (see FIG. 2B) is dropped away as has been heretofore considered, and the dropping away of this relay causes the restoration to normal conditions of the relays that have been maintained picked up dependent upon the energized condition of the relay TD.

The tracking of an eastbound vehicle through the right-of-way illustrated in FIG. 1 has thus been completed and it is to be understood that the circuit organization that has been described is typical of the circuit organization that would be employed in practice for extending the territory to any number of passing sidings or similar track layouts, additional steps being used on the stepper for additional storages, and repeater steppers being used if necessary to provide a sufficient number of steps to register the presence of the vehicle throughout the entire length of the extended right-of-way.

*Reset.*—After the vehicle has left the territory, the operator of the centralized traffic control machine at the control office can cause restoration to a normal position (step No. 30) of a stepping relay for a vehicle leaving the territory by actuation of a homing button HPB (see FIG. 2F) associated with that stepping relay. Thus, for example, for restoration of the stepping relay 1ESP to its normal position, the operator removes the token for the vehicle from the token jack TJE1 (see FIG. 1) on the token panel 55 and depresses a homing push button E1HPB (see FIG. 2F). The actuation of this button to its depressed position causes the picking up of relay E1H by the energization of a circuit including contact 248 of button E1HPB in its depressed position, winding of relay E1H, back contact 249 of relay E2H, back contact 250 of relay E3H and back contacts of other homing relays that may be provided in the system as indicated by XX. Relay E1H when picked up is maintained energized by a stick circuit including back contact 251 of relay CK and front contact 252 of relay E1H.

Upon the picking up of the homing relay E1H as has been described, and after the homing push button E1HPB has been restored to its normal position, a circuit is closed for pulsing the stepping relay 1ESP until it is actuated to its homing (step 30) position. This circuit includes contacts 248, 253 and 254 of push buttons E1HPB, E3HPB and E2HPB in their normal positions respectively, front contact 255 of relay ESPP, front contact 256 of relay E1H and contact 226 of the stepping relay 1ESP. It will be noted that the contact 226 is maintained closed until the stepping relay 1ESP reaches its thirtieth step, and thus when it reaches this point, it opens its own circuit so that it will stop at that point. The pulsing of the relay 1ESP is rendered effective by the relay ESPP in the same manner as has been heretofore described for the actuation of the stepping relay 1ESP through successive steps. Thus the stepping relay 1ESP is actuated to its normal position after actuation of the homing push button E1HPB, and this stepping relay is conditioned so that it can be used for tracking the passage of another vehicle through the right-of-way in accordance with the insertion of a token in the token jack TJE1 (see FIG. 1) on the Token Panel 55. It will be readily apparent that the mode of operation that has been described for the resetting of the stepping relay 1ESP is typical of the mode of operation provided for the resetting of other stepping relays for use in tracking vehicles for either direction of traffic.

When the relay 1ESP has been actuated to its homing position, the relay CK is picked up to open the stick circuit for the relay E1H at back contact 251 and thus cause the restoration to normal conditions of this relay. Relay CK is picked up at this time by the energization of a circuit including front contact 257 of relay E1H, movable contactor 258 of stepping relay 1ESP on its thirtieth step and back contact 259 of relay E1. The relay E1 is in its dropped away position at this time because the dropping away of relay ESPP upon actuation of the stepping relay 1ESP has opened the stick circuit for relay E1 at front contact 76. After the relay E1H has dropped away because of the picking up of relay CK, the relay E1 becomes restored to its picked up position by the energization of a circuit including front contact 76 of relay ESPP and back contacts 260, 261 and 262 of relays E3H, E2H and E1H respectively. This opens the circuit that has been described for the energization of relay CK at back contact 259 and thus causes the dropping away of relay CK.

*Recording of Meets and Passes.*—With reference to the data illustrated as being printed on the train record sheet 51 in FIG. 1, it will be noted that there is a choice of three different symbols to be printed between the hour and minutes printed on the record sheet. One of these symbols is a dot, a second symbol is a dash, and a third symbol is an oblique line. When the dot is printed, it indicates that the track switch at that particular field station was in its normal position and there was no vehicle within the passing siding. If a dash is printed, it is indicative of the track switch having been normal and the siding occupied to show that that particular vehicle was meeting or passing another vehicle at the passing siding, that particular vehicle having taken the main track. The oblique line symbol is indicative of siding occupancy with the track switch reversed, and thus the use of such symbol in connection with printing the record for a particular vehicle indicates that such vehicle has taken the passing siding for the meeting or passing of another vehicle.

The relays involved in selecting the printing of such symbols as has been described are the relays SO, NK and RK (see FIG. 2C). The siding occupancy relay SO is picked up whenever the storage stepping relay for eastbound or westbound traffic provides a storage for the siding of the presence of a vehicle, provided that the field station at either end of the passing siding is transmitting indications to the control office. For the siding A (see FIG. 1), for example, the picking up of either the station relay 2ST or 3ST (see FIG. 2E) when any one of the stepping relays for eastbound traffic is on step 4, provides for the energization of relay SO. Thus the relay SO becomes energized when these conditions are met by the closure of a circuit including movable contactor 263 of relay 1ESP in its step 4 position, wire 264, front contacts 265 and 266 of station relays 2ST and 3ST connected in multiple and wire 267. Similarly the relay SO would be energized by the stepping relay 2ESP (see FIG. 2F) if this relay were in use and the movable contactor 268 were at the step 4 position. Furthermore the relay SO is subject to control by the energization of similar circuits (not shown) for storages by stepper relays for west-bound traffic, energy being applied selectively to the wires 269 and 270. The relays NK and RK (see FIG. 2C) are selectively actuated in accordance with the position of the track switch at the field station which is transmitting an OS indication as has been heretofore considered.

The selection of a code to be punched in the tape of the tape puncher 59 as the sixth code during a cycle of operation is thus selected in accordance with the position jointly of the relays SO, NK and RK. If the track switch is normal and the siding unoccupied, only the relay NK is picked up, and only wire 5 associated with the reference line P6 is energized for actuating the solenoid control wire C5 (see FIG. 2A) for the control of the tape puncher 59. The circuit by which energy is applied to this wire includes front contact 270 of relay NK (see FIG. 2C) and back contact 271 of the siding occupancy relay SO.

If the track switch is in its reverse position so that the relay RK is in its picked up position rather than the relay NK, energy is applied to the wires 1, 5 and 6 through front contacts 272, 273 and 274 of relay RK respectively. This code calls for the printing of an oblique line on the train record sheet.

If the track switch is normal and the siding is occupied, the relays SO and NK are both in their picked up positions, and thus energy is applied to wire 7 associated with the reference line P6 through front contact 270 of relay NK and front contact 271 of relay SO to punch a distinctive code on the tape to call for the printing of a dash symbol on the train record sheet 51.

*Timer Coder.*—It has been heretofore pointed out how the Tape Puncher 59 and the Automatic Typewriter 50 are operated in accordance with time codes set up by contacts of the stepping relays T1, T2 and T3 (see FIG. 2B). Consideration will now be given as to how these stepping relays are operated.

Relay TEP (see FIG. 2B) is pulsed at a rate of one operation per minute responsive to the pulsing of contact 69 by a cam CM1, which in turn is driven by the synchronous motor CM. It is further provided that the relay TEP is maintained energized at times when the recording of a time is being made so that the code will not be changed during a cycle of operation; but this does not seriously affect the timing because of the relatively short interval of time required for the printing to take place on the Train Record Sheet 51. The entire cycle of operation may take only slightly more than one second, for example, dependent upon the type of code communication system with which the present invention is employed. The stick circuit by which relay TEP is maintained picked up at this time includes front contact 275 of relay TD (see FIG. 2C), were 276 and front contact 277 of relay TEP. The relay TD has been described as being maintained picked up until after the Tape Puncher 59 has completed its operation.

Each time the relay TEP is picked up, the closure of its front contact 278 energizes the stepping relay T1 and thus actuates the stepping relay T1 one step for each minute. On the ninth step of the stepping relay T1, the stepping relay T1 closes a circuit whereby the next pulse will also energize the relay T2 to actuate the stepping relay T2 one step. The circuit includes front contact 278 of relay TEP, movable contactor 279 of stepping relay T1 in step 9 position and winding of stepping relay T2. Similarly the stepping relay T2 is actuated when the stepping relay T1 is on steps 19 and 29. Thus the stepping switch T2 is actuated at ten minute intervals.

The stepping relay T2 therefore counts one hour upon taking six steps, and the relay T3 becomes actuated every hour in accordance with the energization of circuits closed for its winding during steps 5, 11, 17, 23 and 29 of stepping relay T2. The circuit by which the stepping relay T3 is energized when stepping relay T2 is on step 5, for example, includes front contact 278 of relay TEP, movable contactor 279 of stepping relay T1 and movable contactor 280 of stepping relay T2 in its step 5 position. Thus the stepping relay T3 is actuated one step for each hour until twelve steps have been taken, and then it is stepped rapidly to step 15 so that it is in condition to start another cycle of operation. The energization of the stepping relay T3 during steps 12, 13 and 14 is through movable contactor 281 of stepping relay T3 and back contact 282' of relay T3. The back contact 282' of relay T3 is opened upon energization of the relay T3, and thus provides pulsing to drive the stepping relay to its step 15 position.

In addition to the means for driving the stepping relays T1, T2 and T3 as has been described, each of these relays can also be actuated for setting by the actuation of associated push buttons. Thus the relay T1 can be set by actuation of push button 282, the relay T2 by actuation of push button 283 and the relay T3 by actuation of push button 284. The selection of codes for punching the tape 58 by the Tape Puncher 59 in accordance with time has been heretofore considered.

*Plurality of Vehicles in a Block.*—In addition to the mode of operation in tracking as has been heretofore described for the passage of a single vehicle, provision is made for the storage of identity and relative sequence of vehicles for a plurality of vehicles in the same block between passing sidings, and also for each of the passing sidings. Thus with reference to FIG. 1, steps 1 and 2 are illustrated as being associated with the block approaching the passing siding A and the steps 3 and 4 are illustrated as being associated with occupancy of the passing siding A.

The first vehicle to enter the block approaching the passing siding A will have its associated stepping relay actuated to step No. 2 as has been heretofore described, and if a following vehicle occupies that same block before the first vehicle leaves that block, its associated stepping relay will be actuated to step No. 1 only when the first vehicle enters the next OS track section, the storage of the second vehicle is moved in its stepping relay from step No. 1 to step No. 2. Thus the order of vehicles is maintained in the stepping relays. It is necessary to maintain a distinction between successive vehicles in a block because the time of the first vehicle entering the next OS track section should be registered at the time when entry is made, and a subsequent time should be registered for the second vehicle when that vehicle enters the OS track section. It is therefore provided that registration of a time on the Train Record Sheet 51 is rendered effective only for the vehicle having its presence registered by step 2 for the block approaching the passing siding A, and similarly registration on the Train Record Sheet 51 is rendered effective only for vehicles in the passing siding having their presence registered by their associated stepping relays being on step No. 4.

To consider the mode of operation more specifically, it will be assumed that the presence of a first vehicle in the block approaching the passing siding A for eastbound traffic is registered by the stepping relay 1ESP being actuated to step No. 2 as has been heretofore described. It will further be assumed that a second vehicle enters the block and the operator pushes his station 1 push button SBP (see FIG. 2C) to cause the picking up of relay 1ST for registering the presence of the second vehicle. It will also be assumed that the token for the second vehicle is inserted in token jack TJE2 (see FIG. 1) on the token panel 55 to render the stepping switch 2ESP effective for tracking the second vehicle.

Relay TD (see FIG. 2C) is picked up as has been heretofore described in response to actuation of the button SPB for registering the second vehicle into the block, and the relay 2EP (see FIG. 2D) becomes picked up to select the code set up by the token inserted in the jack TJE2 as the code to select the particular row on the Train Record Sheet 51 in which the record of the progress of the second vehicle will be printed. The circuit for the energization of the relay 2EP includes front contact 120 of relay TD (see FIG. 2C), wire 121, back contact 122 of relay E2DR, front contact 123 of relay 1ST, wire 124, movable contactor 285 of stepping relay 2ESP in step 30 position, wire 286, contact 287 of the switch closed by the insertion of the token in the token jack TJE2 and upper winding of relay 2EP. The picking up of this relay closes a stick circuit at front contact 288 to energize the lower winding of relay 2EP and maintain that relay picked up throughout the cycle of operation. The punching of the tape by the Tape Puncher 59 follows the same mode of operation as has been heretofore described, the codes punched being such as to actuate the Train Record Sheet 51 in the Automatic Typewriter 50 to a position to type a time in the row corresponding to the code of the token inserted, and in a column corresponding to station No. 1.

The picking up of the station relay 1ST causes the picking up of relay ERO3 (see FIG. 2D) by the energization of a circuit including front contact 213 of relay 1ST (see FIG. 2E) and wire 214. The relay ERO2 is also picked up at this time because of the stepping relay 1ESP being assumed to be in its step 2 position. The circuit for the energization of relay ERO2 includes movable contactor 218 of stepping switch 1ESP in the step 2 position, wire 227, front contact 228 of relay 1ST and wire 229.

The stepping switch 2ESP becomes actuated to its step No. 1 position in accordance with the energization of its winding by a circuit including front contact 207 of relay 1ST (see FIG. 2E), wire 208, front contact 209 of relay 1ST, front contact 289 of relay 2EP, wire 290 and contact 291 of stepping relay 2ESP. The energization of relay 2ESP opens back contact 70 in the circuit for relay ESPP (see FIG. 2D) and causes this relay to be dropped away and to open the circuit for relay EADR at front contact 73. When the stepping relay 2ESP is actuated to its step No. 1 position, energy is applied through movable contactor 292 of this relay, wire 219, front contact 220 of relay 1ST and wire 221 to the winding of relay ERO1 to cause the picking up of that relay. With the relays ERO1, ERO2 and ERO3 all in their picked up positions, there can be no further circuit closed during the cycle for the energization of relay EADR, and thus there is no further progress of the stepping of the stepping relay 2ESP during that cycle of operation.

Assuming that two eastbound vehicles are approaching the passing siding A as has been described, and the first vehicle has its storage identified by the relay 1ESP on step 2, and the second vehicle has its storage identified by the relay 2ESP on step 1, it will now be assumed that the first vehicle moves into the passing siding A, and thus enters the detector track section 54 (see FIG. 1) over the track switch at the left-hand end of the passing siding A in its reverse position. With the track switch in its reverse position, the stepping relay 1ESP is stepped to step No. 4, but it cannot proceed to step No. 5 because of all of the step counting relays ERO1, ERO2 and ERO3 being in their picked up positions after the fourth step has been taken.

The progress in stepping to steps 3 and 4 of the stepping relay 1ESP is the same as has been heretofore described for the passage of a vehicle on the main track. The relay ERO3 is picked up as has been heretofore described in accordance with the closure of front contact 240' of relay 2ST (see FIG. 2E). Relay ERO2 is picked up as has been heretofore described in accordance with the closure of front contact 240 of relay 2ST and in accordance with the relay 1ESP being in its second step position. When the stepping relay 1ESP is actuated to step No. 4, a circuit is closed for the energization of relay ERO1, with the track switch in its reverse position including movable contactor 218 (see FIG. 2F) of stepping relay 1ESP in its step 4 position, front contact 293 of relay 2ST, front contact 294 of relay RK and wire 221.

With the relays ERO1, ERO2 and ERO3 all in their picked up positions, the relay EADR cannot be picked up again for actuation of the stepping relay 1ESP to step 5. This is in accordance with step 5 being reserved for storage of a vehicle in the stretch of main track associated with the passing siding A. The step No. 3 can be used for storage of the presence of the second vehicle in the passing siding A if such vehicle is moved into the passing siding.

With the relays ERO1, ERO2 and ERO3 all in their picked up positions, the relay E2DR becomes picked up to initiate the transfer of the storage in stepping relay 2ESP from step 1 to step 2. The circuit by which the relay E2DR is picked up includes front contacts 73, 74, 223 and 295 of relays ESPP, ERO1, ERO2 and ERO3 respectively and wire 296. This relay is maintained picked up by a stick circuit including wire 297 and front contact 298 of relay E2DR to maintain the relay E2DR picked up for the remainder of the cycle.

Upon the picking up of relay E2DR, the relay 2ERP becomes picked up for selecting the stepping relay 2ESP as the relay to be advanced one step. The circuit by which the relay 2ERP is picked up includes front contact 120 of relay TD (see FIG. 2c), wire 121, front contact 122 of relay E2DR, wire 299, front contact 300 of relay 2ST, wire 301, movable contactor 302 of stepper relay 2ESP on step No. 1 and wire 303. The picking up of relay 2ERP closes a circuit for the energization of the winding of stepping relay 2ESP including back contact 304 of relay ERDR (see FIG. 2E), wire 305, front contact 306 of relay E2RP, wire 307 and contact 308 of relay 2ESP which is closed at this time. The energization of relay 2ESP advances that relay to step No. 2, and the energization also opens back contact 70 in the circuit for the relay ESPP to cause the relay ESPP to become dropped away. The dropping away of relay ESPP closes a circuit for the picking up of relay ERDR to remove energy from the winding of the stepping relay 2ESP. Relay ERDR is picked up by the energization of a circuit including front contact 309 of relay 2ERP, back contact 310 of relay ESPP and wire 311. Relay ERDR is maintained picked up for the remainder of the cycle of operation by the closure of a stick circuit including front contact 312 of relay ERDR. The opening of back contact 304 of relay ERDR deenergizes the stepping relay 2ESP and thus causes the relay ESPP (see FIG. 2D) to become picked up but the relay ERDR remains in its picked up position until the end of the cycle and thus no further advance of the stepping relay 2ESP can be made at this time.

The stepping relay 2ESP is thus advanced to step No. 2 because its associated vehicle is the next vehicle to enter the OS track section 54 (see FIG. 1), either to proceed on the main track or to enter the passing siding. If the vehicle is to enter the passing siding, the indication of the track switch being in its reverse position provides that the stepping relay 2ESP will be advanced only one step, but if the track switch is in its normal position, this provides that the stepping relay 2ESP will be advanced to step No. 5, which is the step that is used for storage of the presence of a vehicle in the main stretch of track associated with the passing siding A. If the second vehicle is moved into the passing siding A so that two vehicles occupy the passing siding, the first vehicle is stored as has been described by the stepping relay 1ESP being on step 4, and the second vehicle is stored as being in the passing siding A by its stepping relay 2ESP being operated only to step No. 3. Thus the order of vehicles is maintained by the sequence of step storages, even though they are both being tracked by different stepping relays.

It will be noted that under conditions where east-bound vehicles are occupying both the main track and passing siding for the same direction of traffic as has been heretofore described, the advance of a stepper in accordance with the movement of the first vehicle out of the passing siding is chosen in accordance with the position of the track switch. Thus, if the OS track section at the right-hand end of the passing siding A is entered by a vehicle with the track switch in its reverse position, the stepping relay belonging to the vehicle having occupied the passing siding is advanced to step 7 (if no other vehicle is in the block 52). If, on the other hand, the vehicle entering the OS track section at the right-hand end of the track section A is entering with the track switch at that end of the passing siding in its normal position, the stepping relay providing a storage for that vehicle is advanced from step 5 to step 7 (assuming no other vehicle is occupying the block between passing sidings A and B).

If a first vehicle is already occupying the block between the passing sidings A and B, the stepping relay belonging to the vehicle entering the block will be actuated only to step 6 in accordance with the same principles of operation that have been heretofore specifically described for moving a second vehicle into the block in approach of the passing siding A for eastbound traffic.

It is believed that it should be readily apparent from the typical circuits that have been described in detail that a similar mode of operation is rendered effective in tracking the passage of first and second vehicles through the area associated with the passing siding B. It is to be further understood that similar apparatus to that which has been described is provided for the tracking of westbound vehicles, and the mode of operation of the tracking apparatus upon the meeting of vehicles at passing sidings is comparable to the organization that has been described, except that the tracking of eastbound and westbound vehicles is provided by separate similar apparatus.

Having thus described one embodiment of a recording system for printing arrival times of vehicles on a record sheet, it is to be understood that this embodiment has been disclosed more particularly to illustrate the principles and mode of operation involved, and that various adaptations, alterations and modifications may be applied to the specific form shown according to the requirements of practice without in any manner departing from the spirit or scope of the present invention except as limited by the appending claims.

What I claim is:

1. A recording system for printing arrival times on a record sheet of vehicles when passing given spaced locations along a right-of-way in designated rows and columns of a tabulation on a record sheet comprising, punching means selectively responsive to the progress of a vehicle along the right-of-way through each of the locations for selectively punching on a tape codes indicative of at least the identity of the vehicle and its location and time of arrival at such location; and typewriting means selectively responsive to the punching on the tape for selectively positioning the record sheet in the typewriter to a selected row and column in accordance with the identity and location codes respectively punched on the tape, said typewriting means being effective to type a time on the record sheet in accordance with a time code punched on the tape when the record sheet has been positioned to a selected row and column.

2. A recording system according to claim 1 wherein the given spaced locations are field stations in a centralized traffic control system and communication means is provided for communication of vehicle occupancy indications from the several field stations to a control office for rendering the punching means effective.

3. A recording system according to claim 2 wherein the communication means includes normally at rest code communication apparatus rendered operable through an indication cycle of operation upon passage of a vehicle at any one of the field stations for transmitting vehicle occupancy indications to the control office.

4. A recording system according to claim 3 wherein the punching of the tape by said punching means is rendered effective only during a cycle of operation of the code communication system.

5. A recording system for printing arrival times on a record sheet of vehicles when arriving at the ends of passing sidings in a single track right-of-way comprising, stepping means operable through several steps for tracking the passage of a particular vehicle through the right-of-way, circuit means for actuating said stepping means at least one step when said particular vehicle arrives at the several ends of the passing sidings, and means responsive to the arrival of said particular vehicle at each siding end for typing the arrival time of the vehicle on a train record sheet in a row selected in accordance with the identity of the vehicle and in a column selected in accordance with the step to which said stepping is actuated.

6. A recording system according to claim 5 wherein the stepping means includes a stepper relay for tracking step by step the passage of said particular vehicle through the right-of-way.

7. A recording system according to claim 5 wherein said stepping means is actuated selectively different numbers of steps upon arrival of a vehicle at the end of a passing siding, the number of steps actuated being determined in accordance with whether or not at least one vehicle is in a stretch of right-of-way substantially immediately in advance of said particular vehicle.

8. A recording system to claim 7 wherein said stepping means for a second vehicle is advanced one step in response to a first vehicle having arrived at one end of a passing siding.

9. A recording system for printing arrival times at a control office on a record sheet of vehicles when arriving at the ends of passing sidings in a single track right-of-way comprising, a token panel at the control office having a plurality of multiple contact token jacks disposed thereon, a plurality of tokens receivable in the token jacks, each of the tokens having a distinctive combination of positions for actuating the multiple contacts selectively of any one of said token jacks to set up a distinctive identification code characteristic of a particular vehicle for which the token may be inserted in any one of the token jacks, a stepping relay for each of the token jacks for tracking a vehicle identified by the identity code of a token inserted in the token jack, stepping means for actuating said stepping relay in response to the arrival of a vehicle corresponding to the identity code of an associated token at each of the ends of the passing sidings, and recording means including said tokens and said stepping relays responsive to the arrival of vehicles at the ends of the passing sidings for printing the arrival times on a record sheet in rows selected by the identity codes of the tokens and in columns corresponding to the ends of the passing sidings.

10. A recording system according to claim 9 wherein the stepping relays select a particular token jack for controlling the recording means in response to the approach of an end of a passing siding by a vehicle.

11. A recording system for printing arrival times on a record sheet at a control office of a vehicle when it arrives at field stations at the ends of passing sidings in a single track right-of-way comprising, normally at rest code communication means connecting a control office and the field stations operable through a cycle of operation to communicate an indication to the control office in response to the arrival of a vehicle at one of the passing sidings, tracking means at the control office for identifying and tracking the vehicle through the several field stations along the right-of-way, and recording means at the control office responsive to an indication received from a field station by said code communication means for typing the arrival time of the vehicle on a record sheet in a position selected by said tracking means.

12. A recording system according to claim 11 wherein the recording means types the arrival time in a row selected by said tracking means according to vehicle identity and in a column selected according to the particular field station that is transmitting the indication.

13. A recording system according to claim 11 wherein the recording means is rendered operable only during a cycle of operation of the communication means.

14. A recording system according to claim 12 wherein the recording means includes an automatic typewriter actuated by a punched tape and it also includes tape punching means for punching codes on the tape during a cycle of operation of said code communication means.

15. A recording system for printing arrival times at a control office on a record sheet of the arrival of a vehicle at each of several field stations at the ends of passing sidings in a single stretch right-of-way comprising, punching means responsive to the arrival of the vehicle at each of the field stations for punching selected codes on a tape including a code indicative of the arrival time of the vehicle at that field station, and automatic typewriting means selectively actuated by punchings on said tape for typing the arrival times of said vehicle at the several field stations in the same row but in different columns.

16. A recording system according to claim 15 wherein said punching means comprises stepping means for selectively punching codes indicative of time.

17. A recording system according to claim 16 wherein the stepping means includes a plurality of stepping relays for counting minutes and hours respectively.

18. A recording system according to claim 17 wherein codes for minutes are selected by one of the stepping relays and codes for hours are selected by another of the stepping relays.

19. A recording system at a control office for indicating the arrival of vehicles at the ends of passing sidings in a single track right-of-way comprising, stepping means operable through several steps for tracking the passage of a vehicle through the right-of-way, said stepping means being actuated in response to a vehicle approaching an end of a passing siding for a number of steps selected in accordance with the position of the track switch at that end of the passing siding, and indication means controlled in accordance with the condition of said stepping means for indicating the arrival of a vehicle at the ends of the passing sidings.

20. A recording system according to claim 19 wherein said indication means comprises automatic typewriting means for typing arrival times on a record sheet of vehicles in rows selected by said stepping means.

References Cited by the Examiner

UNITED STATES PATENTS

| | | | |
|---|---|---|---|
| 624,385 | 5/99 | Sedgwick | 346—81 X |
| 1,124,820 | 1/15 | Simonsson | 346—52 |
| 1,183,969 | 5/16 | Gransbury | 346—93 X |
| 1,342,635 | 6/20 | Lewis | 246—124 |
| 1,456,560 | 5/23 | Metropole et al. | 197—20 |
| 2,020,146 | 11/35 | Johnson | 246—124 |
| 2,206,550 | 7/40 | Mordin | 246—2 X |
| 2,388,351 | 11/45 | Tholstrup | 197—20 X |
| 2,474,438 | 6/49 | Schmidt | 340—23 |
| 2,980,225 | 4/61 | Intagliata et al. | 197—20 X |
| 2,988,269 | 6/61 | Reichert | 346—52 X |

ARTHUR L. LA POINT, *Primary Examiner.*

JAMES S. SHANK, *Examiner.*